(12) United States Patent
Misumi (10) Patent No.: US 9,831,825 B2
(45) Date of Patent: Nov. 28, 2017

(54) SOLAR PHOTOVOLTAIC SYSTEM PROTECTING APPARATUS AND SOLAR PHOTOVOLTAIC SYSTEM PROTECTING METHOD

(71) Applicant: OMRON Corporation, Kyoto (JP)

(72) Inventor: Shuichi Misumi, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/321,749

(22) PCT Filed: Feb. 24, 2015

(86) PCT No.: PCT/JP2015/055262
§ 371 (c)(1),
(2) Date: Dec. 23, 2016

(87) PCT Pub. No.: WO2016/017195
PCT Pub. Date: Feb. 4, 2016

(65) Prior Publication Data
US 2017/0141722 A1    May 18, 2017

(30) Foreign Application Priority Data
Jul. 29, 2014 (JP) .................................. 2014-154199

(51) Int. Cl.
*H02S 40/30* (2014.01)
*G01R 31/02* (2006.01)
(Continued)

(52) U.S. Cl.
CPC .............. *H02S 40/30* (2014.12); *G01R 31/02* (2013.01); *H02H 3/16* (2013.01); *H02H 7/20* (2013.01); *H02S 50/10* (2014.12)

(58) Field of Classification Search
CPC .. H02H 3/16; H02H 7/20; H02H 3/26; H02H 5/105; H02H 7/10; G01R 31/02;
(Continued)

(56) References Cited

U.S. PATENT DOCUMENTS 8,213,133 B2 * 7/2012 Buchhold .............. H01H 9/542
218/2
8,467,160 B2 * 6/2013 West ........................ H02H 3/16
361/42

(Continued)

FOREIGN PATENT DOCUMENTS

JP    2013-542699    11/2013
JP    2014-509396    4/2014

*Primary Examiner* — Rita Leykin
(74) *Attorney, Agent, or Firm* — JCIPRNET (57) ABSTRACT

In order to provide a simple and reliable configuration capable of detecting whether an arc is a serial arc or a parallel arc and extinguishing these arcs, a solar photovoltaic system protecting apparatus determines whether or not an arc is present in a state where a first relay (41P, 41N) is closed and a second and a third relay (42, 43P, 43N) are open, identifies whether the arc is a parallel arc or a serial arc in a state where the first relay (41P, 41N) and the second relay (42) are closed, and opens the first relay (41P, 41N) in a case where a serial arc has been generated and closes the third relay (43P, 43N) in a case where a parallel arc has been generated.

9 Claims, 6 Drawing Sheets (51) Int. Cl.
  *H02S 50/10* (2014.01)
  *H02H 3/16* (2006.01)
  *H02H 7/20* (2006.01)

(58) Field of Classification Search
  CPC ...... G01R 31/01; G01R 31/05; G01R 31/001;
       G01R 31/08; G01R 31/12; G01R 31/24;
       G01R 31/26; G01R 31/28; G01R 31/27;
       G01R 31/34; G01R 31/36; G01R 31/40;
       G01R 31/44; H02S 40/30; H02S 50/10;
       H02S 50/00
  USPC .............. 361/6, 33, 56, 86, 88, 20; 340/635
  See application file for complete search history.

(56) References Cited

U.S. PATENT DOCUMENTS

| | | | | |
|---|---|---|---|---|
| 8,619,396 B2* | 12/2013 | West | ........................ | H01H 9/30 361/3 |
| 8,742,828 B2* | 6/2014 | Naumann | .............. | H01H 9/542 327/419 |
| 8,922,958 B2* | 12/2014 | Ganireddy | ................ | H01T 2/02 361/2 |
| 8,929,038 B2 | 1/2015 | Strobl et al. | | |
| 8,958,182 B2* | 2/2015 | Luebke | ................ | H02H 1/0015 136/244 |
| 9,136,688 B2 | 9/2015 | Laschinski et al. | | |
| 9,214,817 B2* | 12/2015 | Coors | ..................... | H02J 3/383 |
| 9,413,155 B2* | 8/2016 | Blemel | ................ | H02H 1/0023 |
| 9,543,088 B2* | 1/2017 | Merz | ........................ | H01H 9/42 |
| 2012/0319489 A1* | 12/2012 | McCaslin | ................ | H02J 1/10 307/77 |
| 2014/0009163 A1* | 1/2014 | Ward | ................... | G01R 31/327 324/424 |
| 2014/0063662 A1* | 3/2014 | Scott | ..................... | G08B 13/22 361/42 |
| 2014/0091808 A1* | 4/2014 | Henke | ................... | G01R 31/02 324/511 |
| 2015/0103454 A1* | 4/2015 | Schripsema | ......... | H02H 1/0015 361/63 |

* cited by examiner

SOLAR PHOTOVOLTAIC SYSTEM PROTECTING APPARATUS AND SOLAR PHOTOVOLTAIC SYSTEM PROTECTING METHOD

CROSS-REFERENCE TO RELATED APPLICATION

This application is a 371 application of the international PCT application serial no. PCT/JP2015/055262, filed on Feb. 24, 2015, which claims the priority benefit of Japan application no. 2014-154199, filed on Jul. 29, 2014. The entirety of each of the above-mentioned patent applications is hereby incorporated by reference herein and made a part of this specification.

TECHNICAL FIELD

The present invention relates to a solar photovoltaic system protecting apparatus and a solar photovoltaic system protecting method for protecting a solar photovoltaic system from parallel arcs and serial arcs generated in the system.

RELATED ART

Conventionally, solar photovoltaic systems are configured such that electric power generated by a solar cell is supplied to a power grid via a power conditioner including a booster, a DC/AC converter, and the like. Such solar photovoltaic systems have a risk that a failure in a circuit or the like in the systems may cause an arc in the circuit. If an arc is generated, the temperature of the portion where the arc is generated increases, which may possibly lead to a fire and the like. Accordingly, such solar photovoltaic systems are provided with a protecting apparatus for protecting the systems from arcs.

The above-described arcs include a serial arc and a parallel arc, and countermeasures for extinguishing arcs vary according to the type of arc. Accordingly, the protecting apparatus includes a function of detecting generation of an arc and identifying whether the generated arc is a serial arc or a parallel arc, and a function of extinguishing a serial arc and a parallel arc. Known examples of the configurations of such a protecting apparatus include those disclosed in Patent Documents 1 and 2.

According to the configuration described in Patent Document 1, electric power generated by a solar cell (photovoltaic generator) is supplied via an inverter to a power grid. A circuit breaker is provided between the solar cell and the inverter on a DC power line, and a capacitor is provided in parallel with the circuit breaker. Furthermore, on the DC power line, a current sensor is provided downstream of the circuit breaker, and a short-circuit switch that shorts a positive electrode and a negative electrode of the solar cell is provided downstream of the current sensor.

According to the configuration described in Patent Document 1, when an AC signal is detected based on an output signal from the current sensor, the circuit breaker is turned off (turned into a cutoff state), and, if the AC signal that flows through the DC power line via the capacitor decreases, it is determined that a serial arc has been generated. In this case, the serial arc is extinguished by turning the circuit breaker off.

On the other hand, if the AC signal does not decrease, it is determined that the AC signal is derived from an interference source or a parallel arc. In this case, the circuit breaker is turned on (turned into a conducting state), and the short-circuit switch is turned on (turned into a conducting state). In this state, if the AC signal decreases, it is determined that a parallel arc has been generated, and, if the AC signal does not decrease, it is determined that the AC signal is derived from an interference source. If a parallel arc has been generated, the parallel arc is extinguished by turning the short-circuit switch on.

Furthermore, according to the configuration described in Patent Document 2, electric power generated by a solar cell (solar cell power generation apparatus) is supplied via an inverter to a power grid as in the case of Patent Document 1. A circuit breaker (disconnector) and an arc sensor are provided between the solar cell and the inverter on a DC power line, and a short-circuit switch that shorts a positive electrode and a negative electrode of the solar cell is provided between the circuit breaker and the arc sensor. The arc sensor is connected to a controller for electric power management (MPPT) attached to the inverter.

According to the configuration described in Patent Document 2, the MPPT determines whether or not an arc is present based on a detection signal from an arc sensor, detects a change in the electric power of the arc while adjusting the electric power management (MPP), and, if the electric power of the arc decreases, determines whether the arc is a serial arc or a parallel arc based on the adjustment direction of the electric power management (MPP). Furthermore, as in the case of Patent Document 1, the circuit breaker is turned off if the arc is a serial arc, and the short-circuit switch is turned on if the arc is a parallel arc.

RELATED ART DOCUMENTS

Patent Documents

Patent Document 1: Published Japanese Translation of PCT International Publication "JP 2014-509396A (Tokuhyo) (published on Apr. 17, 2014)"

Patent Document 2: Published Japanese Translation of PCT International Publication "JP 2013-542699A (Tokuhyo) (published on Nov. 21, 2013)"

SUMMARY OF THE INVENTION

Problem to be Solved by the Invention

According to the configuration described in Patent Document 1, as described above, a capacitor is provided in parallel with a circuit breaker, wherein, when an AC signal is detected, the circuit breaker is turned off (turned into a cutoff state), and, if the AC signal that flows through the DC power line via the capacitor decreases, it is determined that a serial arc has been generated.

However, since the AC signal is detected by the current sensor after passing through the capacitor, the AC signal tends to deteriorate when passing through the capacitor, and thus it may be hard for the current sensor to accurately detect the AC signal. Furthermore, a capacitor is a component having poor characteristics in terms of durability, and thus the capacitor tends to cause a failure in a power circuit where high breakdown voltage is required. Accordingly, use of a capacitor is problematic in that the reliability of the protecting apparatus may be lowered.

Furthermore, according to the configuration described in Patent Document 2, as described above, an MPPT recognizes whether or not an arc is present based on a detection signal from an arc sensor, detects a change in the electric power of the arc while adjusting the electric power management (MPP), and, if the electric power of the arc decreases, identifies whether the arc is a serial arc or a parallel arc based on the adjustment direction of the electric power management (MPP). Accordingly, this configuration is problematic in that the configuration for identifying whether the arc is a serial arc or a parallel arc is complicated.

Thus, it is an object of the present invention to provide a solar photovoltaic system protecting apparatus and a solar photovoltaic system protecting method in which a function of detecting generation of an arc in a solar photovoltaic system, identifying whether the generated arc is a serial arc or a parallel arc, and extinguishing the arcs can be realized by a simple and reliable configuration.

Means for Solving the Problems

In order to solve the above-described problems, a solar photovoltaic system protecting apparatus of the present invention is characterized by including: a first relay provided on a first current path that outputs electric power of a solar cell, and configured to open and close the first current path; a second relay provided on the downstream side of the first relay as seen from the solar cell, on a second current path that shorts positive and negative outputs of the solar cell, and configured to open and close the second current path; a third relay provided on the upstream side of the first relay as seen from the solar cell, on a third current path that shorts the positive and negative outputs of the solar cell, and configured to open and close the third current path; an arc signal detecting portion configured to detect an arc signal indicating generation of an arc, from the first current path; an arc presence determining portion configured to determine whether or not generation of an arc is present, based on the arc signal, in an arc presence determining state in which the first relay is in a closed state and the second and the third relays are in an open state; an arc identifying portion configured to determine whether the arc is a parallel arc or a serial arc, based on the arc signal, in an arc identifying state in which the first and the second relays are in a closed state and the third relay is in an open state; and a control portion configured to turn the first to the third relays into the arc identifying state in a case where the arc presence determining portion determines that an arc is generated, turn the first relay from the arc identifying state to an open state in a case where the arc identifying portion determines that the arc is a serial arc, and turn the third relay from the arc identifying state to a closed state in a case where the arc identifying portion determines that the arc is a parallel arc.

Effects of the Invention

According to the configuration of the present invention, a function of detecting generation of an arc in a solar photovoltaic system, identifying whether the generated arc is a serial arc or a parallel arc, and extinguishing the arcs can be realized by a simple, reliable, small, and low-cost configuration.

EMBODIMENTS OF THE INVENTION

Figure 1:
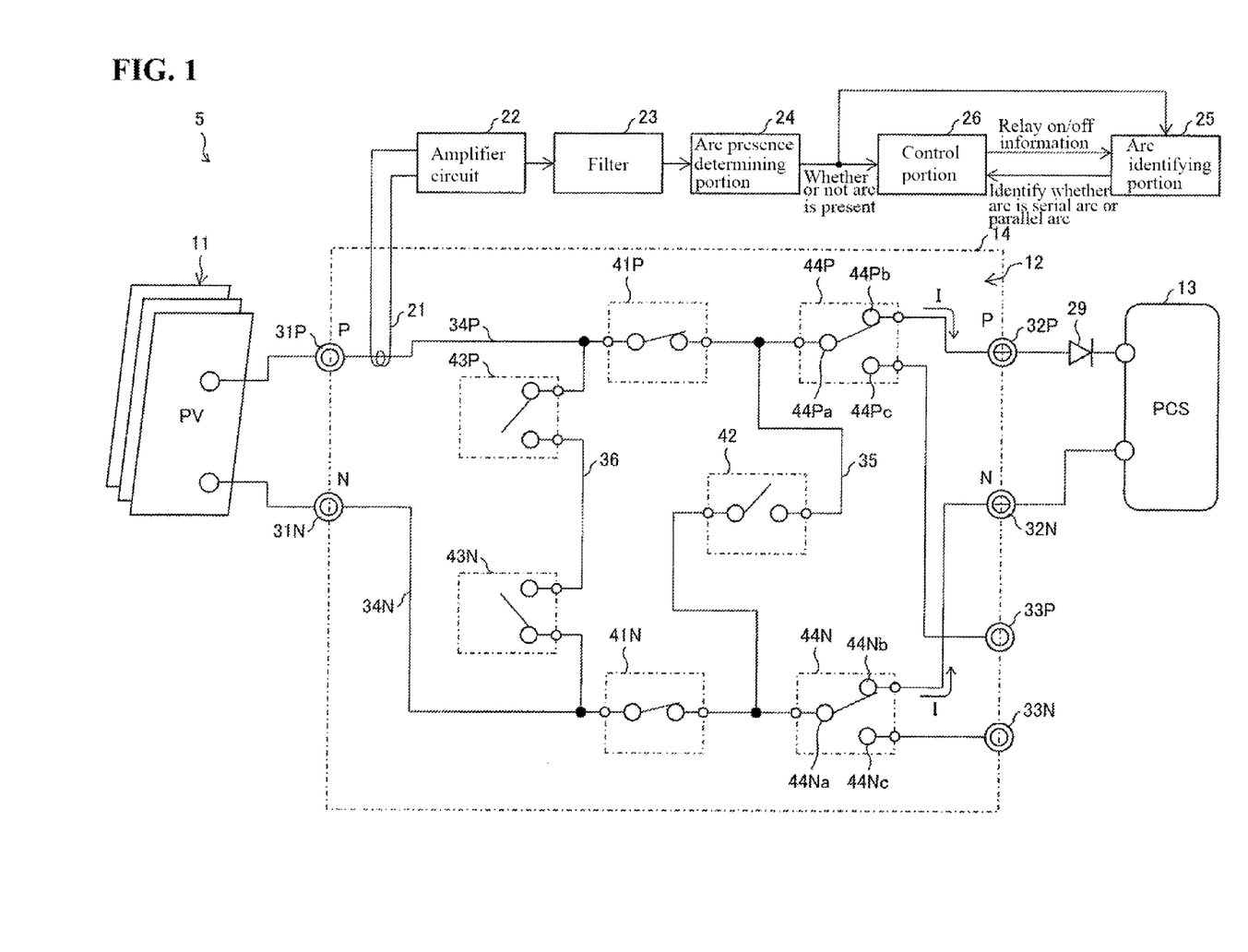
FIG. 1 is a circuit diagram of a solar photovoltaic system according to an embodiment of the present invention, showing a state in which the system is properly operating.

Hereinafter, an embodiment of the present invention will be described with reference to the drawings. FIG. 1 is a circuit diagram of a solar photovoltaic system according to an embodiment of the present invention, showing a state in which the system is properly operating (an arc presence determining state).

As shown in FIG. 1, a solar photovoltaic system 1 includes a plurality of solar cells 11, a relay circuit 12, and a power conditioning system (hereinafter, referred to as a PCS) 13. The solar photovoltaic system 1 further includes a current transformer (arc signal detecting portion) 21, an amplifier circuit (arc signal detecting portion) 22, a filter (arc signal detecting portion) 23, an arc presence determining portion 24, an arc identifying portion 25, and a control portion 26. The arc presence determining portion 24, the arc identifying portion 25, and the control portion 26 are configured by, for example, microcomputers. In this embodiment, a protecting apparatus 5 is configured by the relay circuit 12, the current transformer 21, the amplifier circuit 22, the filter 23, the arc presence determining portion 24, the arc identifying portion 25, and the control portion 26.

The relay circuit 12 is provided on a relay board 14, and has a plurality of relays (relay units). The relay board 14 has an input P terminal 31P and an input N terminal 31N along an edge on one side, and an output P terminal 32P, an output N terminal 32N, a measurement P terminal 33P, and a measurement N terminal 33N along an edge on the opposite side. The solar cells 11 are connected to the input P terminal 31P and the input N terminal 31N, and the PCS 13 is connected to the output P terminal 32P and the output N terminal 32N. A diode 29 is provided in a forward direction between the output P terminal 32P and the PCS 13. The measurement P terminals 33P and 33N are terminals to which measurement devices can be connected, and are not used in the operation in this embodiment.

A P-side first relay 41P and a P-side fourth relay 44P are provided in series from the input P terminal 31P toward the output P terminal 32P, on a P-side first current path 34P between the input P terminal 31P and the output P terminal 32P. In a similar manner, an N-side first relay 41N and an N-side fourth relay 44N are provided in series, on an N-side first current path 34N between the input N terminal 31N and the output N terminal 32N.

Furthermore, a point between the P-side first relay 41P and the P-side fourth relay 44P on the P-side first current path 34P and a point between the N-side first relay 41N and the N-side fourth relay 44N on the N-side first current path 34N are connected to each other via a second current path 35, and a second relay 42 that opens and closes the second current path 35 is provided on the second current path 35.

Furthermore, a point between the input P terminal 31P and the P-side first relay 41P on the P-side first current path 34P and a point between the input N terminal 31N and the N-side first relay 41N on the N-side first current path 34N are connected to each other via a third current path 36, and a P-side third relay 43P and an N-side third relay 43N that open and close the third current path 36 are provided in series on the third current path 36. The P-side third relay 43P and the N-side third relay 43N are latching relays.

The P-side fourth relay 44P has a movable contact 44Pa, a fixed contact 44Pb, and a fixed contact 44Pc. In a similar manner, the N-side fourth relay 44N has a movable contact 44Na, a fixed contact 44Nb, and a fixed contact 44Nc.

The movable contact 44Pa is connected to another terminal of the P-side first relay 41P and one terminal of the second relay 42, the fixed contact 44Pb is connected to the output P terminal 32P, and the fixed contact 44Pc is connected to the measurement P terminal 33P. In a similar manner, the movable contact 44Na is connected to another terminal of the N-side first relay 41N and another terminal of the second relay 42, the fixed contact 44Nb is connected to the output N terminal 32N, and the fixed contact 44Nc is connected to the measurement N terminal 33N.

The current transformer 21 is disposed on the P-side first current path 34P, and detects an AC signal that flows through the P-side first current path 34P. The AC signal includes arc noise (arc signal) that is generated by an arc when an arc has been generated in the solar photovoltaic system 1. Note that the current transformer 21 may be disposed on the N-side first current path 34N.

The amplifier circuit 22 amplifies the AC signal detected by the current transformer 21. The filter 23 extracts a signal at a predetermined frequency corresponding to arc noise, from the AC signal. The arc presence determining portion 24 determines whether or not an arc has been generated, based on the signal output from the filter 23. If the arc presence determining portion 24 determines that an arc has been generated, the arc identifying portion 25 identifies whether the arc is a serial arc or a parallel arc, based on a change in the arc noise in accordance with the control of the second relay 42 by the control portion 26.

The control portion 26 controls a switching operation of the P-side fourth relay 44P and the N-side fourth relay 44N. Furthermore, according to a recognition result (determination result) by the arc presence determining portion 24 and an arc identification result by the arc identifying portion 25, the control portion 26 controls on/off of the P-side first relay 41P, the N-side first relay 41N, the second relay 42, and the P-side third relay 43P, and the N-side third relay 43N.

Figure 2:
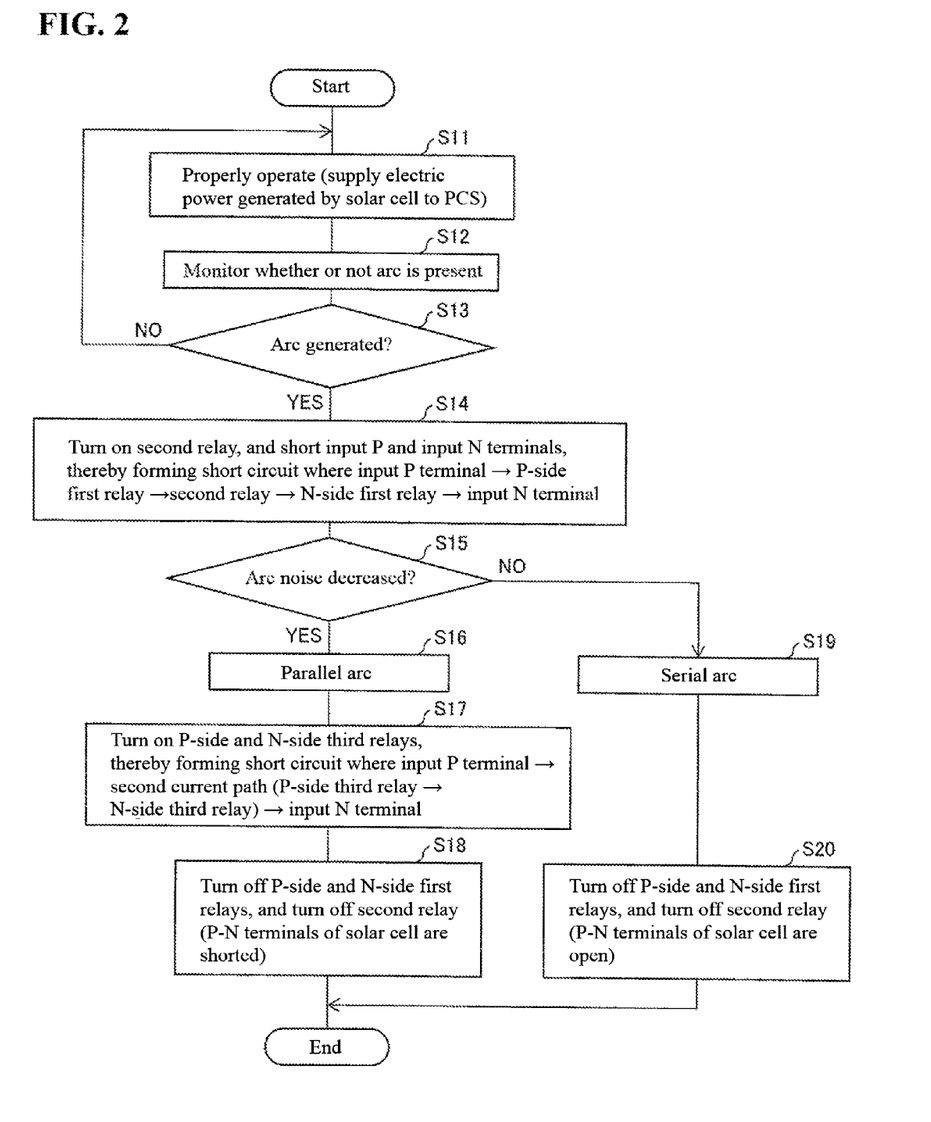
FIG. 2 is a flowchart showing an operation of the solar photovoltaic system shown in FIG. 1.

In the above-described configuration, an operation of the solar photovoltaic system 1 will be described below. FIG. 2 is a flowchart showing an operation of the solar photovoltaic system 1.

In FIG. 2, if the solar photovoltaic system 1 is properly operating (S11), as shown in FIG. 1, the control portion 26 performs control so that the P-side third relay 43P is off (in an open state), the P-side first relay 41P is on (in a closed state), and the movable contact 44Pa of the P-side fourth relay 44P is switched to the fixed contact 44Pb. In a similar manner, the N-side third relay 43N is off (in an open state), the N-side first relay 41N is on (in a closed state), and the movable contact 44Na of the N-side fourth relay 44N is switched to the fixed contact 44Nb. This state is an arc presence determining state. In this state, electric power generated by the solar cells 11 is supplied via the P-side and N-side first current paths 34P and 34N to the PCS 13.

In the above-described state, if an AC signal flows through the P-side first current path 34P, the AC signal is detected by the current transformer 21, and is amplified by the amplifier circuit 22. Furthermore, if the AC signal contains arc noise, the arc noise is extracted by the filter 23, and is input to the arc presence determining portion 24 (an arc signal detecting step). The arc presence determining portion 24 monitors whether or not generation of an arc is present (whether or not arc noise is present) in the solar photovoltaic system 1, based on the signal input from the filter 23 (S12, an arc presence determining step).

Figure 3:
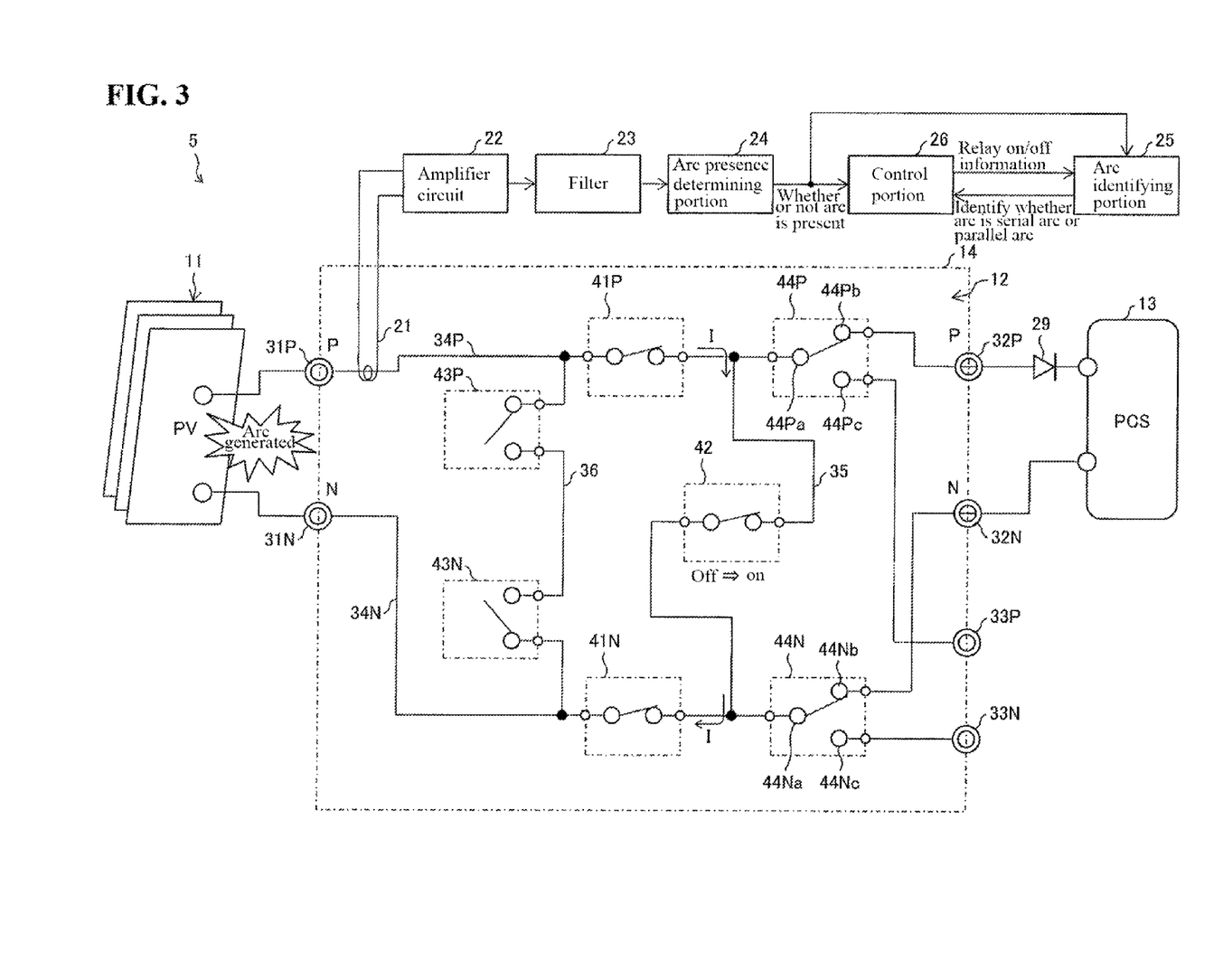
FIG. 3 is a circuit diagram of the solar photovoltaic system shown in FIG. 1, showing a state in which generation of an arc has been detected.

If the arc presence determining portion 24 detects arc noise and determines that an arc has been generated (S13), as shown in FIG. 3, the control portion 26 turns the second relay 42 on (S14). Accordingly, a short circuit (a path of a current I) is formed in which a current flows from the P terminals of the solar cells 11, via the input P terminal 31P→the P-side third relay 43P→the P-side first relay 41P→the second relay 42→the N-side first relay 41N→the N-side third relay 43N→the input N terminal 31N, to the N terminals of the solar cells 11. FIG. 3 is a circuit diagram showing a state of the solar photovoltaic system 1 (an arc identifying state) in the case where generation of an arc has been detected.

Next, the arc identifying portion 25 determines whether or not the arc noise decreases after the second relay 42 is turned on (S15). If it is determined that the arc noise decreases, it is identified that the arc is a parallel arc (S16, an arc identifying step). Note that, in order to reliably detect whether or not the arc is a parallel arc, the processes in S14 and S15 may be repeated a plurality of times.

Figure 4:
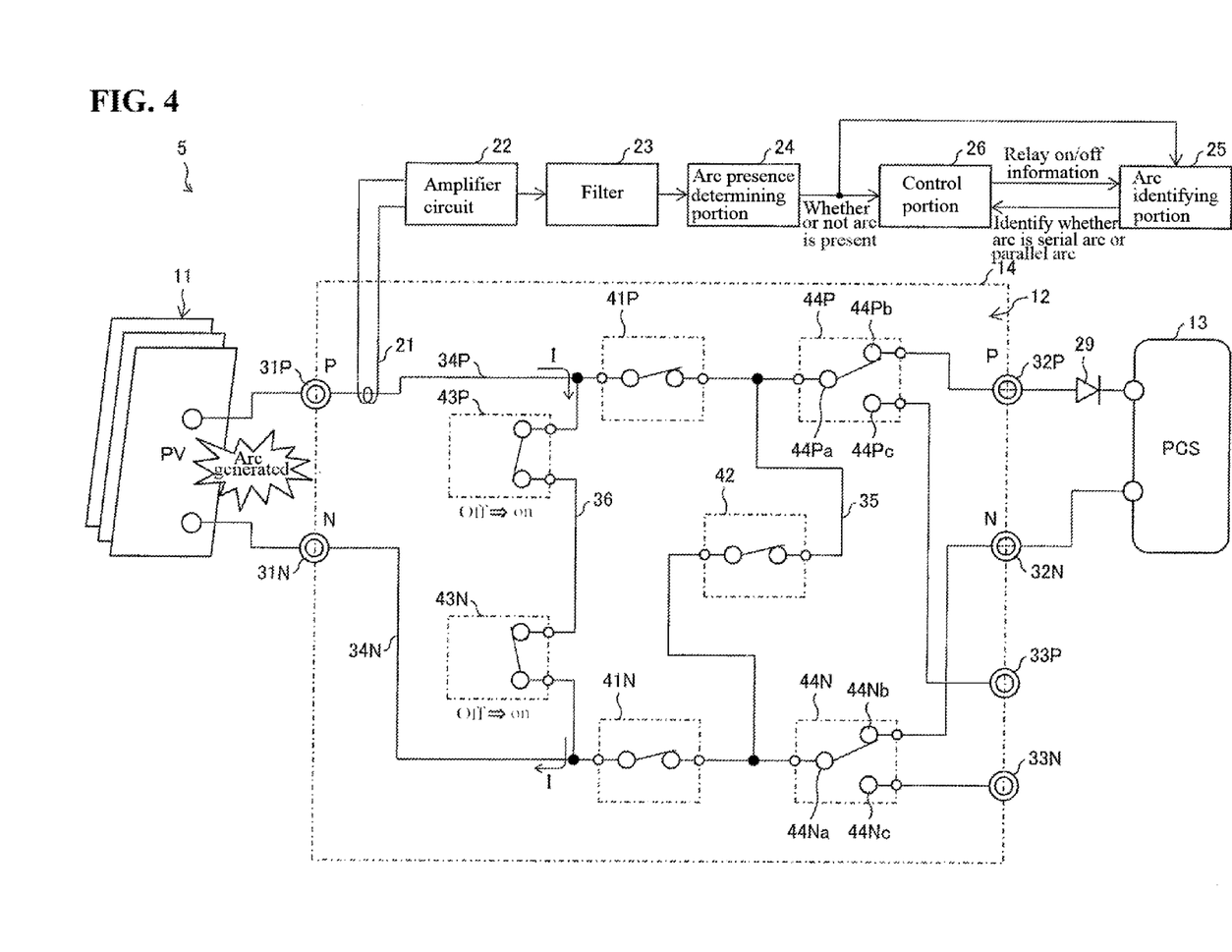
FIG. 4 is a circuit diagram of the solar photovoltaic system shown in FIG. 1, showing a state in which the arc is a parallel arc.

If the arc identifying portion 25 identifies that the arc is a parallel arc, as shown in FIG. 4, the control portion 26 turns on the P-side third relay 43P and the N-side third relay 43N (S17, a parallel arc dealing step). Accordingly, as shown in FIG. 4, a short circuit (a path of the current I) is formed in which a current flows from the P terminals of the solar cells 11, via the input P terminal 31P→the third current path 36 (the P-side third relay 43P→the N-side third relay 43N)→the input N terminal 31N, to the N terminals of the solar cells 11. FIG. 4 is a circuit diagram showing a state of the solar photovoltaic system 1 in the case where the arc is a parallel arc. As described above, a parallel arc is extinguished by shorting the P terminals and the N terminals of the solar cells 11.

Figure 5:
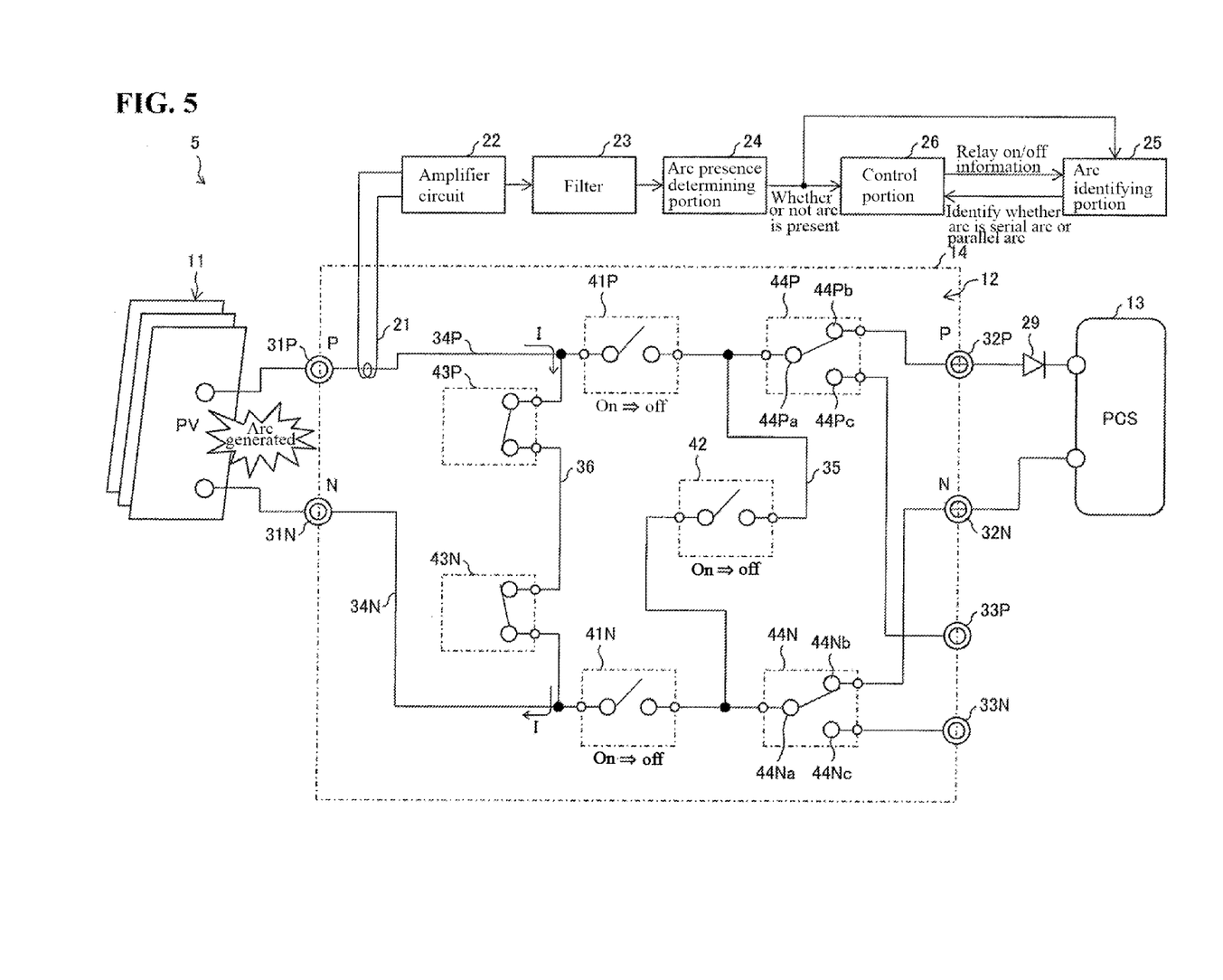
FIG. 5 is a circuit diagram showing a state after stopping the solar photovoltaic system shown in FIG. 1, in the case where a parallel arc has been generated.

Then, as shown in FIG. 5, the control portion 26 turns the P-side first relay 41P, the N-side first relay 41N, and the second relay 42 off (into an open state), thereby stopping the solar photovoltaic system 1 (S18). FIG. 5 is a circuit diagram showing a state after stopping the solar photovoltaic system 1, in the case where a parallel arc has been generated. In this case, the state in which the P terminals and the N terminals of the solar cells 11 are shorted is maintained, and the P-side and N-side first current paths 34P and 34N between the solar cells 11 and the PCS 13 are open. Note that, since the P terminals and the N terminals of the solar cells 11 are kept shorted, the state in which the parallel arc has been extinguished is maintained.

On the other hand, if it is determined in S15 that the arc noise does not decrease or increases, the arc identifying portion 25 identifies that the arc is a serial arc (S19, an arc identifying step).

Figure 6:
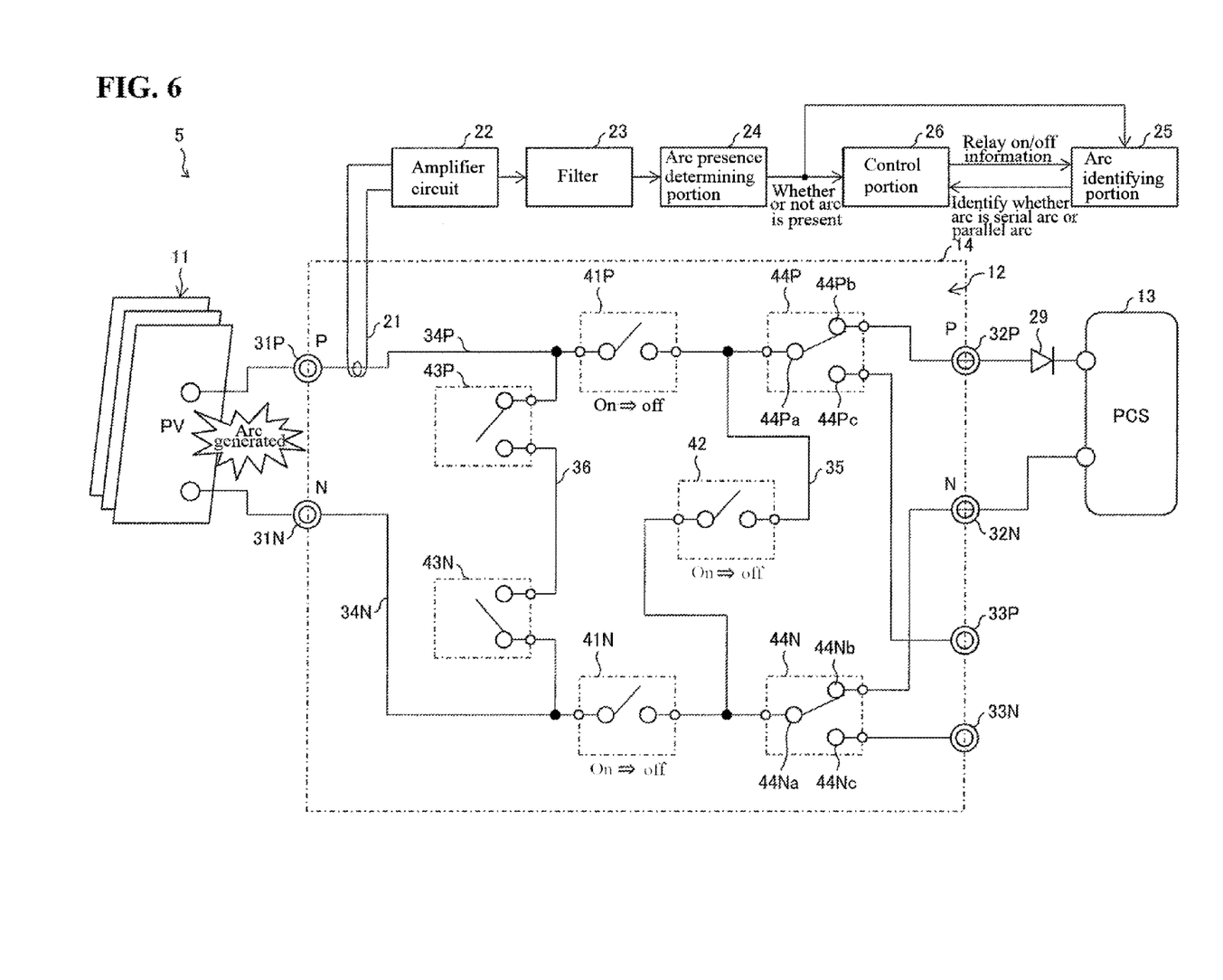
FIG. 6 is a circuit diagram showing a state after stopping the solar photovoltaic system shown in FIG. 1, in the case where a serial arc has been generated.

If the arc identifying portion 25 identifies that the arc is a serial arc, as shown in FIG. 6, the control portion 26 changes the state in FIG. 3 so as to turn the P-side first relay 41P and the N-side first relay 41N off (into an open state) (a serial arc dealing step), and turn the second relay 42 off (into an open state) (S20), thereby stopping the solar photovoltaic system 1. FIG. 6 is a circuit diagram showing a state after stopping the solar photovoltaic system 1, in the case where a serial arc has been generated. In this case, the P-side and N-side first current paths 34P and 34N between the solar cells 11 and the PCS 13 are open. Furthermore, points between the P terminals and the N terminals of the solar cells 11 are also open.

As described above, the solar photovoltaic system 1 of this embodiment is configured such that, in a state where the solar photovoltaic system 1 is operating (a state in which electric power generated by the solar cells 11 is output), if generation of an arc has been detected based on an AC signal (arc noise) detected by the current transformer 21, first, the second relay 42, which is a relay for identifying an arc type, is turned on assuming that the arc is a parallel arc, and it is determined whether or not the arc noise decreases. If it is determined that the arc noise decreases, it is identified that the arc is a parallel arc. On the other hand, if the arc noise does not decrease or increases, it is identified that the arc is a serial arc, and thus the P-side and the N-side first relays 41P and 41N are turned off, and the P-side and N-side first current paths 34P and 34N are interrupted from the solar cells 11.

Accordingly, whether the arc is a serial arc or a parallel arc can be identified by a simple configuration. Furthermore, the relay circuit 12 extending from the solar cells 11 to the PCS 13 does not require elements that tend to deteriorate AC signals (arc noise) or elements that tend to cause failures, such as capacitors, and thus it is possible to determine whether or not generation of an arc is present, and to determine whether the arc is a parallel arc or a serial arc, accurately based on the detection signal, and it is further possible to provide a high level of reliability.

Furthermore, when identifying the arc type, first, the second relay 42, which is a relay for identifying an arc type, is turned on, so that the P terminals and the N terminals of the solar cells 11 are shorted via the second current path 35, and, in this state, if it is identified that the arc is a parallel arc, the P-side and the N-side third relays 43P and 43N for extinguishing a parallel arc are turned on, so that the P terminals and the N terminals of the solar cells 11 are shorted via the third current path 36.

In this case, if the arc is a parallel arc, the arc can be decreased by turning the second relay 42 on. Accordingly, the above-described on-operation of the P-side and the N-side third relays 43P and 43N can be performed, simply after the arc identifying portion 25 identifies that the arc is a parallel arc, or after the arc identifying portion 25 identifies that the arc is a parallel arc and it is seen that the arc signal (parallel arc) decreases. Accordingly, small and low-cost components for which the breakdown voltage required is low can be used as the P-side and the N-side third relays 43P and 43N.

Furthermore, since the P-side and the N-side third relays 43P and 43N that short the P terminals and the N terminals of the solar cells 11 via the third current path 36 are latching relays, even when a power source for driving the P-side and the N-side third relays 43P and 43N is interrupted by an accident, a failure, or the like, the state in which the P terminals and the N terminals of the solar cells 11 are shorted can be maintained. Accordingly, the reliability of the function of extinguishing parallel arcs can be further improved.

Note that the solar photovoltaic system 1 is configured such that the third current path 36 includes the P-side third relay 43P and the N-side third relay 43N, the P-side first current path 34P includes the P-side first relay 41P and the P-side fourth relay 44P, and the N-side first current path 34N includes the N-side first relay 41N and the N-side fourth relay 44N. Accordingly, the breakdown voltage required for each relay can be lowered. However, there is no limitation to this configuration, and a configuration is also possible in which the third current path 36 includes only one relay and only either one of the P-side first current path 34P and the N-side first current path 34N includes a relay. That is to say, a configuration is also possible in which the third current path 36 includes the P-side third relay 43P and the P-side first current path 34P includes the P-side first relay 41P and the P-side fourth relay 44P or in which the third current path 36 includes the N-side third relay 43N and the N-side first current path 34N includes the N-side first relay 41N and the N-side fourth relay 44N.

Note that the above-described configuration in which, in the solar photovoltaic system 1, positive electrodes and negative electrodes of the solar cells 11 are shorted when identifying whether the arc is a parallel arc or a serial arc and when extinguishing the parallel arc can be in principle applied to those other than solar photovoltaic systems. However, the above-described configuration is actually applicable only to solar photovoltaic systems due to the following two reasons.

(1) In general power source systems and power generation apparatuses other than solar photovoltaic systems, if a positive electrode and a negative electrode are shorted, a huge inrush current at several thousands to several tens of thousands of amperes is generated. Accordingly, even when a parallel arc has been generated, a positive electrode and a negative electrode are not shorted. Note that, in the case of a solar cell, an inrush current when a positive electrode and a negative electrode are shorted is approximately 10 amperes per panel.

(2) In power source systems other than solar photovoltaic systems, there are various methods for cutting off energy, and thus it is not necessary to use the above-described configuration of the solar photovoltaic system 1, in which a huge inrush current is generated. Examples of the various methods include providing a dedicated cutoff relay in the case of cells, disengaging a clutch in the case of power generation machines, and the like. On the other hand, in the case of solar photovoltaic systems, power is generated anywhere on which light is incident, and thus methods for cutting off parallel arcs are limited.

SUMMARY

The solar photovoltaic system protecting apparatus of the present invention is configured so as to include: a first relay provided on a first current path that outputs electric power of a solar cell, and configured to open and close the first current path; a second relay provided on the downstream side of the first relay as seen from the solar cell, on a second current path that shorts positive and negative outputs of the solar cell, and configured to open and close the second current path; a third relay provided on the upstream side of the first relay as seen from the solar cell, on a third current path that shorts the positive and negative outputs of the solar cell, and configured to open and close the third current path; an arc signal detecting portion configured to detect an arc signal indicating generation of an arc, from the first current path; an arc presence determining portion configured to determine whether or not generation of an arc is present, based on the arc signal, in an arc presence determining state in which the first relay is in a closed state and the second and the third relays are in an open state; an arc identifying portion configured to determine whether the arc is a parallel arc or a serial arc, based on the arc signal, in an arc identifying state in which the first and the second relays are in a closed state and the third relay is in an open state; and a control portion configured to turn the first to the third relays into the arc identifying state in a case where the arc presence determining portion determines that an arc is generated, turn the first relay from the arc identifying state to an open state in a case where the arc identifying portion determines that the arc is a serial arc, and turn the third relay from the arc identifying state to a closed state in a case where the arc identifying portion determines that the arc is a parallel arc.

With this configuration, in a proper state where no arc has been generated, the solar photovoltaic system is in an arc presence determining state in which the first relay is in a closed state and the second and the third relays are in an open state. In this arc presence determining state, the arc presence determining portion determines whether or not generation of an arc is present, based on an arc signal detected by the arc signal detecting portion. If it is determined that an arc has been generated, the control portion turns the first to the third relays into an arc identifying state in which the first and the second relays are in a closed state and the third relay is in an open state.

Next, in the arc identifying state, the arc identifying portion determines whether the arc is a serial arc or a parallel arc, based on the arc signal. If it is determined that the arc is a serial arc, the control portion turns the first relay into an open state. Accordingly, the serial arc can be extinguished.

On the other hand, if it is determined that the arc is a parallel arc, the arc decreases because the first and the second relays are in a closed state. Thus, the control portion turns the third relay into a closed state. Accordingly, the parallel arc can be extinguished.

Accordingly, with this configuration, whether the arc is a serial arc or a parallel arc can be determined by a simple configuration. Furthermore, the first current path and the second current path are not provided with elements that tend to deteriorate arc signals that are AC signals or elements that tend to cause failures, such as capacitors, and thus it is possible to determine whether or not generation of an arc is present, and to identify whether the arc is a parallel arc or a serial arc, accurately based on the detection signal, and it is further possible to provide a high level of reliability.

Furthermore, in the case of shorting the positive and the negative outputs of the solar cell via the third current path by turning the third relay into a closed state when a parallel arc has been generated, the third relay can be turned into a closed state after the arc signal decreases, that is, after the parallel arc decreases. Accordingly, a small and low-cost component for which the breakdown voltage required is low can be used as the third relay.

The above-described solar photovoltaic system protecting apparatus may be configured such that the control portion turns the third relay from the arc identifying state to a closed state, in a case where the arc identifying portion identifies that the arc is a parallel arc and the arc presence determining portion determines that the arc signal decreases.

With this configuration, after it is determined that the arc is a parallel arc, the third relay is switched from the arc identifying state to a closed state after the arc signal decreases, that is, after the parallel arc decreases.

Accordingly, the breakdown voltage required for the third relay can be reliably lowered.

The above-described solar photovoltaic system protecting apparatus may be configured such that the third relay is a latching relay.

With this configuration, since the third relay is switched to a closed state after the arc signal decreases, that is, after the parallel arc decreases, and thus a latching relay whose breakdown voltage is generally low can be used as the third relay.

Furthermore, since the third relay that shorts the positive and the negative outputs of the solar cell is a latching relay, even when a power source for driving the third relay is interrupted by an accident, a failure, or the like, the state in which the positive and the negative outputs of the solar cell are shorted can be maintained. Furthermore, since the positive and the negative outputs of the solar cell are shorted via a latching relay, a switching operation to this state can be promptly performed. Accordingly, the reliability of the function of extinguishing parallel arcs can be further improved.

The above-described solar photovoltaic system protecting apparatus may be configured such that the first to the third relays are arranged such that the third relay is disposed close to the solar cell, the first relay is disposed downstream of the third relay, and the second relay is disposed downstream of the first relay.

With this configuration, an optimal arrangement of the relays can be realized. For example, when a parallel arc has been generated, the positive and the negative outputs of the solar cell can be shorted via the third relay regardless of the state of the first relay. Furthermore, when a serial arc has been generated, the first current path that outputs electric power of the solar cell can be reliably interrupted.

In order to solve the above-described problems, the solar photovoltaic system protecting method of the present invention is configured so as to include: an arc signal detecting step of detecting an arc signal indicating generation of an arc, from a first current path that outputs electric power of a solar cell; an arc presence determining step of determining whether or not generation of an arc is present, based on the arc signal, in an arc presence determining state in which a first relay configured to open and close the first current path is in a closed state and a second relay configured to open and close, on the downstream side of the first relay as seen from the solar cell, a second current path that shorts positive and negative outputs of the solar cell and a third relay configured to open and close, on the upstream side of the first relay as seen from the solar cell, a third current path that shorts the positive and negative outputs of the solar cell are in an open state; an arc identifying step of identifying whether the arc is a parallel arc or a serial arc, based on the arc signal, in an arc identifying state in which the first and the second relays are in a closed state and the third relay is in an open state; a serial arc dealing step of turning the first relay from the arc identifying state to an open state, in a case where it is determined in the arc identifying step that the arc is a serial arc; and a parallel arc dealing step of turning the third relay from the arc identifying state to a closed state, in a case where it is determined in the arc identifying step that the arc is a parallel arc.

With this configuration, actions and effects similar to those in the solar photovoltaic system protecting apparatus can be achieved.

The present invention is not limited to the abovementioned embodiment, and various modifications can be made within the scope described in the claims. Embodiments that are obtained by appropriately combining the technical means disclosed in the embodiment are included in the technical scope of the present invention.

INDUSTRIAL APPLICABILITY

The present invention can be preferably used as an apparatus for protecting a power generation system using solar cells.

The invention claimed is:

1. A solar photovoltaic system protecting apparatus, comprising:
   a first relay provided on a first current path that outputs electric power of a solar cell, and configured to open and close the first current path;
   a second relay provided on the downstream side of the first relay as seen from the solar cell, on a second current path that shorts positive and negative outputs of the solar cell, and configured to open and close the second current path;
   a third relay provided on the upstream side of the first relay as seen from the solar cell, on a third current path that shorts the positive and negative outputs of the solar cell, and configured to open and close the third current path;
   an arc signal detecting portion configured to detect an arc signal indicating generation of an arc, from the first current path;
   an arc presence determining portion configured to determine whether or not generation of an arc is present, based on the arc signal, in an arc presence determining state in which the first relay is in a closed state and the second and the third relays are in an open state;
   an arc identifying portion configured to determine whether the arc is a parallel arc or a serial arc, based on the arc signal, in an arc identifying state in which the first and the second relays are in a closed state and the third relay is in an open state; and
   a control portion configured to turn the first to the third relays into the arc identifying state in a case where the arc presence determining portion determines that an arc is generated, turn the first relay from the arc identifying state to an open state in a case where the arc identifying portion determines that the arc is a serial arc, and turn the third relay from the arc identifying state to a closed state in a case where the arc identifying portion determines that the arc is a parallel arc.

2. The solar photovoltaic system protecting apparatus according to claim 1, wherein the control portion turns the third relay from the arc identifying state to a closed state, in a case where the arc identifying portion identifies that the arc is a parallel arc and the arc presence determining portion determines that the arc signal decreases.

3. The solar photovoltaic system protecting apparatus according to claim 2, wherein the third relay is a latching relay.

4. The solar photovoltaic system protecting apparatus according to claim 3, wherein the first to the third relays are arranged such that the third relay is disposed close to the solar cell, the first relay is disposed downstream of the third relay, and the second relay is disposed downstream of the first relay.

5. The solar photovoltaic system protecting apparatus according to claim 2, wherein the first to the third relays are arranged such that the third relay is disposed close to the solar cell, the first relay is disposed downstream of the third relay, and the second relay is disposed downstream of the first relay.

6. The solar photovoltaic system protecting apparatus according to claim 1, wherein the third relay is a latching relay.

7. The solar photovoltaic system protecting apparatus according to claim 6, wherein the first to the third relays are arranged such that the third relay is disposed close to the solar cell, the first relay is disposed downstream of the third relay, and the second relay is disposed downstream of the first relay.

8. The solar photovoltaic system protecting apparatus according to claim 1, wherein the first to the third relays are arranged such that the third relay is disposed close to the solar cell, the first relay is disposed downstream of the third relay, and the second relay is disposed downstream of the first relay.

9. A solar photovoltaic system protecting method, comprising:
   an arc signal detecting step of detecting an arc signal indicating generation of an arc, from a first current path that outputs electric power of a solar cell;
   an arc presence determining step of determining whether or not generation of an arc is present, based on the arc signal, in an arc presence determining state in which a first relay configured to open and close the first current path is in a closed state and a second relay configured to open and close, on the downstream side of the first relay as seen from the solar cell, a second current path that shorts positive and negative outputs of the solar cell and a third relay configured to open and close, on the upstream side of the first relay as seen from the solar cell, a third current path that shorts the positive and negative outputs of the solar cell are in an open state;
   an arc identifying step of identifying whether the arc is a parallel arc or a serial arc, based on the arc signal, in an arc identifying state in which the first and the second relays are in a closed state and the third relay is in an open state;
   a serial arc dealing step of turning the first relay from the arc identifying state to an open state, in a case where it is determined in the arc identifying step that the arc is a serial arc; and
   a parallel arc dealing step of turning the third relay from the arc identifying state to a closed state, in a case where it is determined in the arc identifying step that the arc is a parallel arc.

* * * * *